United States Patent
Torian (10) Patent No.: US 7,668,619 B2
(45) Date of Patent: Feb. 23, 2010

(54) PERSONALIZED GIFT CARD TEMPLATES (75) Inventor: Jennifer M. Torian, Palatine, IL (US)

(73) Assignee: Walgreen Co., Deerfield, IL (US)

(*) Notice: Subject to any disclaimer, the term of this patent is extended or adjusted under 35 U.S.C. 154(b) by 465 days.

(21) Appl. No.: 11/586,391

(22) Filed: Oct. 25, 2006

(65) Prior Publication Data
US 2008/0103627 A1 May 1, 2008

(51) Int. Cl.
G06F 17/00 (2006.01)

(52) U.S. Cl. .................. 700/233; 700/231; 700/235

(58) Field of Classification Search ............ 700/233, 700/235
See application file for complete search history.

(56) References Cited

U.S. PATENT DOCUMENTS

| | | | |
|---|---|---|---|
| 5,243,174 A * | 9/1993 | Veeneman et al. .......... 235/381 |
| 5,500,514 A | 3/1996 | Veeneman et al. |
| 5,513,117 A * | 4/1996 | Small .................. 700/233 |
| 5,870,718 A * | 2/1999 | Spector ................. 705/26 |
| 6,000,608 A | 12/1999 | Dorf |
| 6,732,459 B1 | 5/2004 | Clark |
| 6,827,260 B2 | 12/2004 | Stoutenburg et al. |
| 6,877,263 B2 | 4/2005 | Clark |
| 7,007,853 B2 | 3/2006 | Corcoran et al. |
| 7,024,807 B2 | 4/2006 | Street |
| 7,040,049 B2 | 5/2006 | Cox et al. |
| 7,478,143 B1 * | 1/2009 | Friedman et al. .......... 709/219 |
| 2002/0138363 A1 | 9/2002 | Karas et al. |
| 2004/0039702 A1 | 2/2004 | Blair et al. |
| 2004/0114766 A1 | 6/2004 | Hileman et al. |
| 2005/0228717 A1 | 10/2005 | Gusler et al. |
| 2006/0015359 A1 | 1/2006 | Merritt |
| 2006/0074803 A1 | 4/2006 | Crowell et al. |
| 2006/0080871 A1 | 4/2006 | McGoey et al. |
| 2006/0097055 A1 | 5/2006 | Corcoran et al. |

* cited by examiner

Primary Examiner—Gene Crawford
Assistant Examiner—Timothy R Waggoner
(74) Attorney, Agent, or Firm—Francis C. Kowalik; Randall G. Rueth; Marshall, Gerstein & Borun LLP (57) ABSTRACT A customizable gift card that may be designed using a plurality of design templates that have modifiable fields and layouts. The gift cards may be designated for use at one or more stores based on contract arrangements between the one or more stores and a vendor of the gift card. The gift card may be adapted to be used exclusively at the one or more designated stores. A point of sale terminal such as a kiosk may be used to reduce shelf space and provide a greater variety of gift card design options to a customer.

21 Claims, 12 Drawing Sheets

Please select retailer:

Company A
Company B
Company C
Company D
Company E

[ Next ]

[ Cancel ]

PERSONALIZED GIFT CARD TEMPLATES

FIELD OF THE INVENTION

The invention generally relates to a system for and method of creating customized gift cards at a point of sale location.

BACKGROUND

Existing gift cards are generally not provided with aesthetic design except for their load value (i.e., amount placed on the card) and/or company logos. While some gift cards may include patterns or designs on the card stock, these patterns are provided by stock suppliers that are pre-printed on the material of the gift card and are not selected for printing by the customer. Moreover, a gift card customer may be unaccustomed to thinking of gift card design when purchasing. For example, gift card customers may simply consider how much to put on the gift card and which gift card stock to use from the limited selection available at a retail store when purchasing the gift card. This may be attributed to the association of gift card purchases as last minute gift ideas or impulse purchasing, both of which involve a quick transaction purchase. In this situation, the customer may simply be concerned with the ability to place a value on the card to be used as a gift. However, providing the opportunity for customers to design the aesthetic look of a gift card may persuade customers to view gift cards as more substantially meaningful gift items and increase gift card sales.

Also, gift cards may be used for generating additional sales besides the sales of a single retail outlet. For example, a net increase may be realized between two stores when gift cards are vended at one store that may be redeemed at a second company's store(s). For example, two companies that sell complimentary products may both experience increased sales by vending a gift card at one company's store that is redeemable at the other company's store or at both companies' stores. Thus, some retail companies, such as pharmacies, may desire to cross promote gift card sales with other companies.

One arrangement for multiple gift cards may be to simply carry multiple cards that are adapted to be used on another company's retail computer network. However, existing retail stores generally must address limited display and inventory space within their stores for the products that they carry. Because gift cards may be considered non-staple products, these gift cards may have lower priority when vying for store space allocation. Thus, existing retails stores may be limited in the number of cross selling arrangements that they may be involved in.

SUMMARY OF THE INVENTION

The claimed method and system provides a customizable gift card. The gift card may be designed using a plurality of design templates that have modifiable fields and layouts. Additionally, the gift cards may be designated for use at one or more stores based on contract arrangements between the one or more stores and a vendor of the gift card. The gift card may be adapted to be used exclusively at the one or more designated stores. A point of sale terminal such as a kiosk may be used to reduce shelf space and provide a greater variety of gift card design options to a customer.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
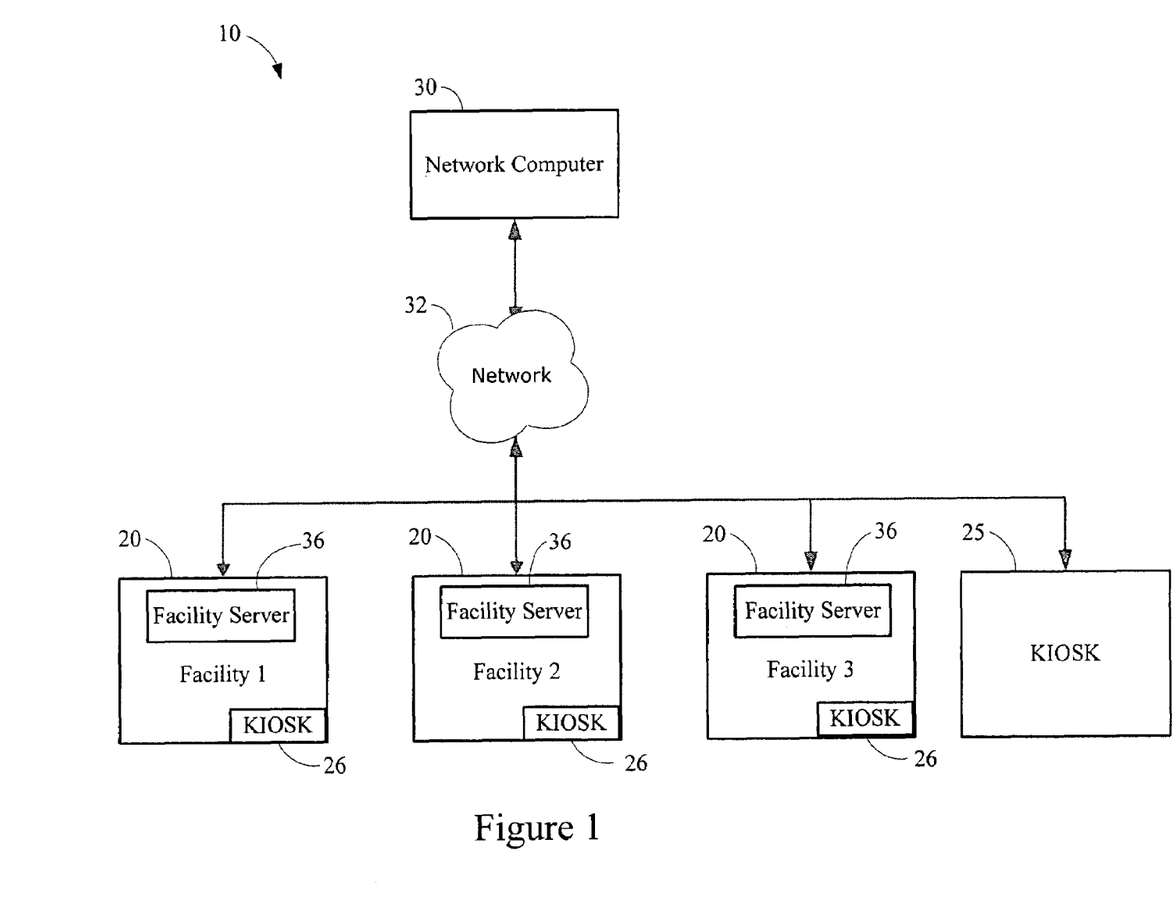
FIGS. 1, 2, 3A and 3B illustrate block diagrams of a computing system that may operate in accordance with the described embodiments.

FIG. 1 illustrates an embodiment of a data network 10 including a first group of stores 20 operatively coupled to a network computer 30 via a network 32. The plurality of stores 20 may be located, by way of example rather than limitation, in separate geographic locations from each other, in different areas of the same city, or in different states. The network 32 may be provided using a wide variety of techniques well known to those skilled in the art for the transfer of electronic data. For example, the network 32 may comprise dedicated access lines, plain ordinary telephone lines, satellite links, combinations of these, etc. Additionally, the network 32 may include a plurality of network computers or server computers (not shown), each of which may be operatively interconnected in a known manner. Where the network 32 comprises the Internet, data communication may take place over the network 32 via an Internet communication protocol.

The network computer 30 may be a server computer of the type commonly employed in networking solutions. The network computer 30 may be used to accumulate, analyze, and download store data. For example, the network computer 30 may periodically receive data from each of the stores 20 indicative of information pertaining to a prescription order, billing information, employee data, etc. The stores 20 may include one or more facility servers 36 that may be utilized to store information for a plurality of customers/employees/accounts/etc. associated with each facility.

Although the data network 10 is shown to include one network computer 30 and three stores 20, it should be understood that different numbers of computers and pharmacies may be utilized. For example, the network 32 may include a plurality of network computers 30 and hundreds of stores 20, all of which may be interconnected via the network 32. According to the disclosed example, this configuration may provide several advantages, such as, for example, enabling near real time uploads and downloads of information as well as periodic uploads and downloads of information. This provides for a primary backup of all the information generated in the process of updating and accumulating store data.

Figure 2:
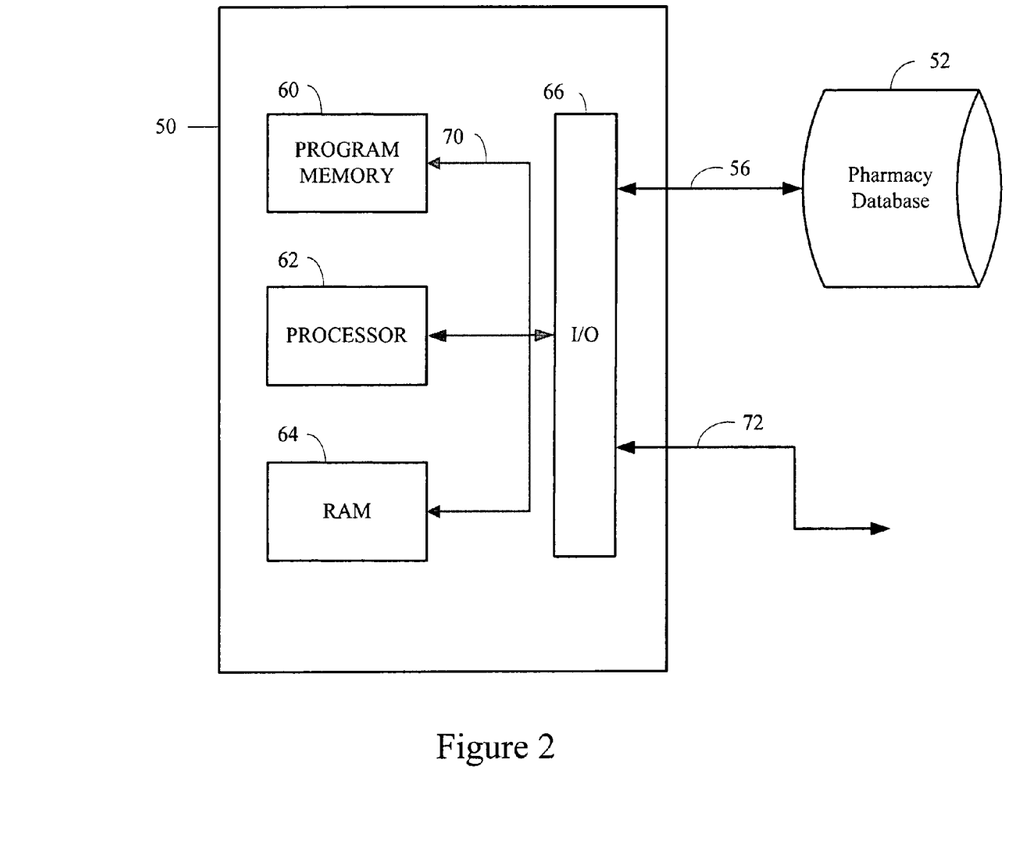

FIG. 2 is a schematic diagram of one possible embodiment of the network computer 30 shown in FIG. 1. The network computer 30 may have a controller 50 that is operatively connected to a database 52 via a link 56. It should be noted that, while not shown, additional databases may be linked to the controller 50 in a known manner.

The controller 50 may include a program memory 60, a processor 62 (may be called a microcontroller or a microprocessor), a random-access memory (RAM) 64, and an input/output (I/O) circuit 66, all of which may be interconnected via an address/data bus 70. It should be appreciated that although only one microprocessor 62 is shown, the controller 50 may include multiple microprocessors 62. Similarly, the memory of the controller 50 may include multiple RAMs 64 and multiple program memories 60. Although the I/O circuit 66 is shown as a single block, it should be appreciated that the I/O circuit 66 may include a number of different types of I/O circuits. The RAM(s) 64 and programs memories 60 may be implemented as semiconductor memories, magnetically readable memories, and/or optically readable memories, for example. The controller 50 may also be operatively connected to the network 32 via a link 72.

Figure 3A:
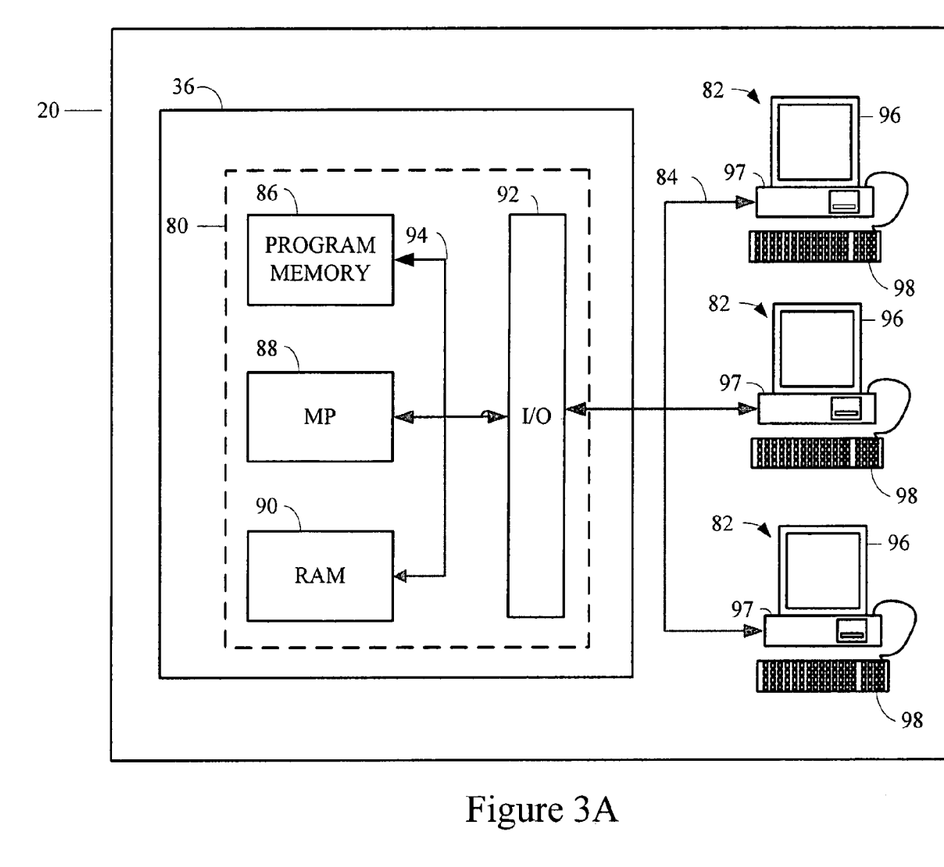

FIG. 3A is a schematic diagram of one possible embodiment of several components located in one or more of the stores 20 from FIG. 1. Although the following description addresses the design of the stores 20, it should be understood that the design of one or more of the stores 20 may be different than the design of other stores 20. Also, each store 20 may have various different structures and methods of operation. It should also be understood that the embodiment shown in FIG. 3A illustrates some of the components and data connections present in a store, however it does not illustrate all of the data connections present in a typical store. For exemplary purposes, one design of a store is described below, but it should be understood that numerous other designs may be utilized.

The stores 20 may have a facility server 36, which includes a controller 80, wherein the facility server 36 is operatively connected to a plurality of client device terminals 82 via a network 84. The network 84 may be a wide area network (WAN), a local area network (LAN), or any other type of network readily known to those persons skilled in the art. The client device terminals 82 may also be operatively connected to the network computer 30 from FIG. 1 via the network 32.

Similar to the controller 50 from FIG. 2, the controller 80 may include a program memory 86, a microcontroller or a microprocessor (MP) 88, a random-access memory (RAM) 90, and an input/output (I/O) circuit 92, all of which may be interconnected via an address/data bus 94. As discussed with reference to the controller 50, it should be appreciated that although only one microprocessor 88 is shown, the controller 80 may include multiple microprocessors 88. Similarly, the memory of the controller 80 may include multiple RAMs 90 and multiple programs memories 86. Although the I/O circuit 92 is shown as a single block, the I/O circuit 92 may include a number of different types of I/O circuits. The RAM(s) 90 and programs memories 86 may also be implemented as semiconductor memories, magnetically readable memories, and/or optically readable memories, for example.

The client device terminals 82 may include a display 96, a controller 97, a keyboard 98 as well as a variety of other input/output devices (not shown) such as a scanner, printer, mouse, touch screen, track pad, track ball, isopoint, voice recognition system, digital camera, etc. Each client device terminal 82 may be signed onto and occupied by an employee to assist them in performing their duties or by a customer to initiate a store service. Employees and/or customers may sign onto a client device terminal 82 using any generically available technique, such as entering a user name and password. If an employee is required to sign onto a client device terminal 82, this information may be passed via the link 84 to the facility server 36, so that the controller 80 will be able to identify which employees are signed onto the system and which client device terminals 82 the employees are signed onto. This may be useful in monitoring the employees' productivity. If a customer signs onto a client device terminal, the customer may be assigned a username and password that may be used to record usage data and/or payment data.

Typically, facility servers 36 store a plurality of files, programs, and other data for use by the client device terminals 82 and the network computer 30. One facility server 36 may handle requests for data from a large number of client device terminals 82. Accordingly, each facility server 36 may typically comprise a high end computer with a large storage capacity, one or more fast microprocessors, and one or more high speed network connections. Conversely, relative to a typical facility server 36, each client device terminal 82 may typically include less storage capacity, a single microprocessor, and a single network connection.

FIG. 1 also illustrates a kiosk 25 that may form a portion of the data network 10. The kiosk 25 may be directly coupled to the network 32 or, alternatively, may be a client device terminal coupled to a facility server 36, as illustrated in FIG. 3A. In one embodiment, the kiosk may be disposed in the facilities or stores 20. The kiosk 25 may include a display 96, a controller 97, a keyboard 98 as well as a variety of other input/output devices such as a scanner, credit card reader, printer, mouse, touch screen, track pad, track ball, isopoint, voice recognition system, digital camera, electronic storage device reader (e.g., flash drive interface or magnetic media reader), etc. Each kiosk 25 may be placed at any location that provides a suitable connection to the network 32, not necessarily a location. The kiosk may be accessed by any customer.

Figure 3B:
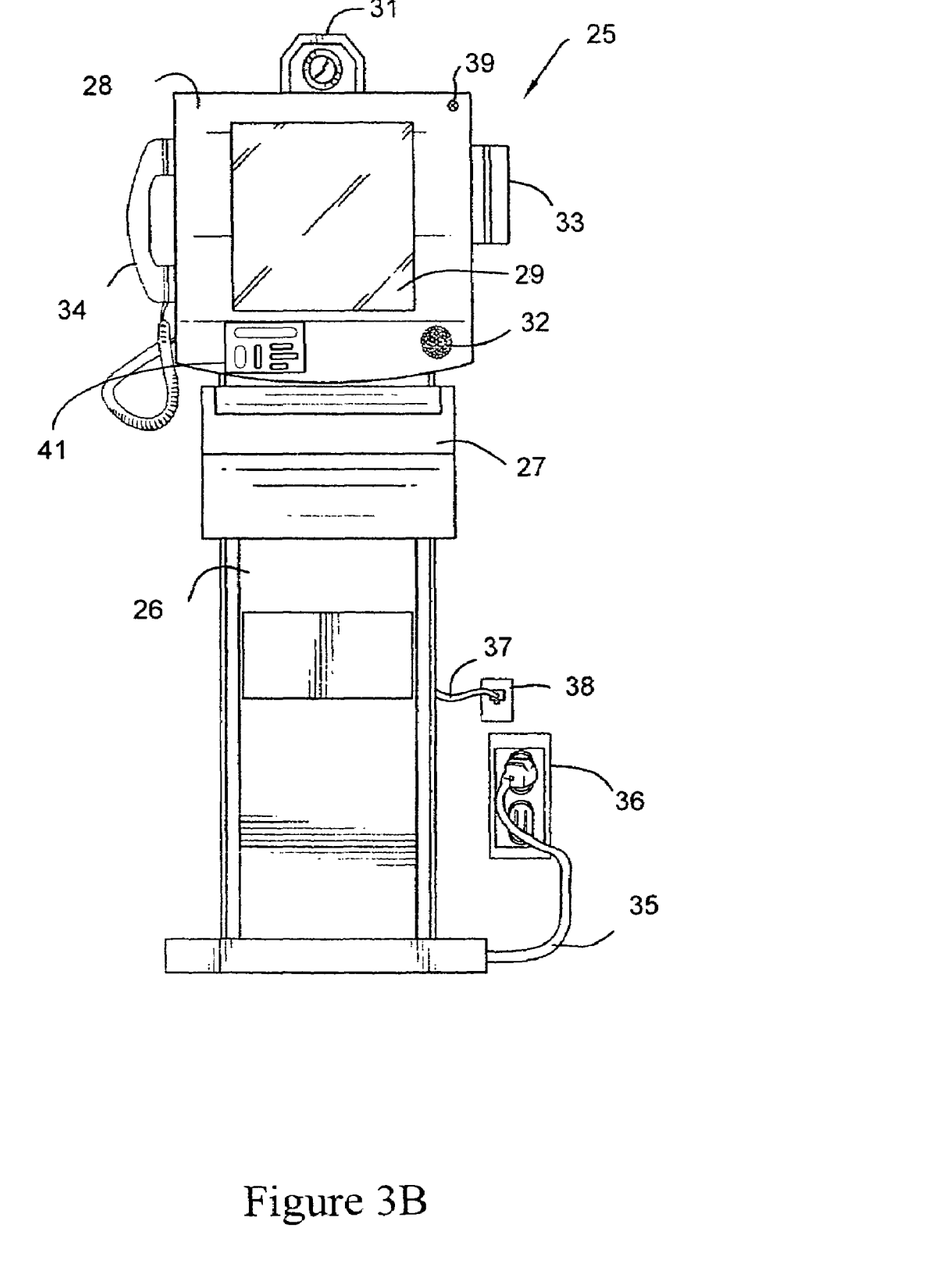

FIG. 3B illustrates a possible kiosk embodiment that may be used in the claimed system. The kiosk 25 includes a housing and base portion 26 which houses a computer system having software thereon that controls the operation of the kiosk 25 in the manner described herein. The computer system may be any suitable type of computer system. Mounted on the housing portion 26 is a computer monitor 28 having a display with a touchscreen 29. One or more speakers and microphones 32 may also be provided on the kiosk 25 at any suitable location. A camera 31 may be mounted on the top of the computer monitor 28 and may be oriented to video a customer standing at the kiosk 25. The speaker, microphone 32 and camera 31 may comprise a videoconference system for the kiosk 25.

A card reader, such as a credit card reader 33, may also be operatively mounted on the side of the computer monitor 28. A handset 34, preferably in the form of a telephone handset, may also be mounted on the kiosk 25 for use by the customer when additional privacy is needed. The kiosk 25 may further include a scanner 27 operable to scan documents and photos. The kiosk 25 may further include a set of interfaces 41 that are adapted to couple to various portable media devices such as flash memories, floppy disks, CD-ROMS, etc. The computer system, monitor, videoconference system, card reader, handset and document scanner may all functionally interconnect to perform the functions described herein. The kiosk 25 may be powered by a conventional power outlet 36 using a power cord 35. The computer system may also include a communication system that is operable to communicate over any desired communications medium using communication line 37. For example, the communication line 37 may be connected, via outlet 38, to a T1 telecommunications line for high-speed communications (e.g., to a network). A motion sensor 39 may also be provided on the kiosk 25, for example, to activate the kiosk when a customer is near.

Figure 4:
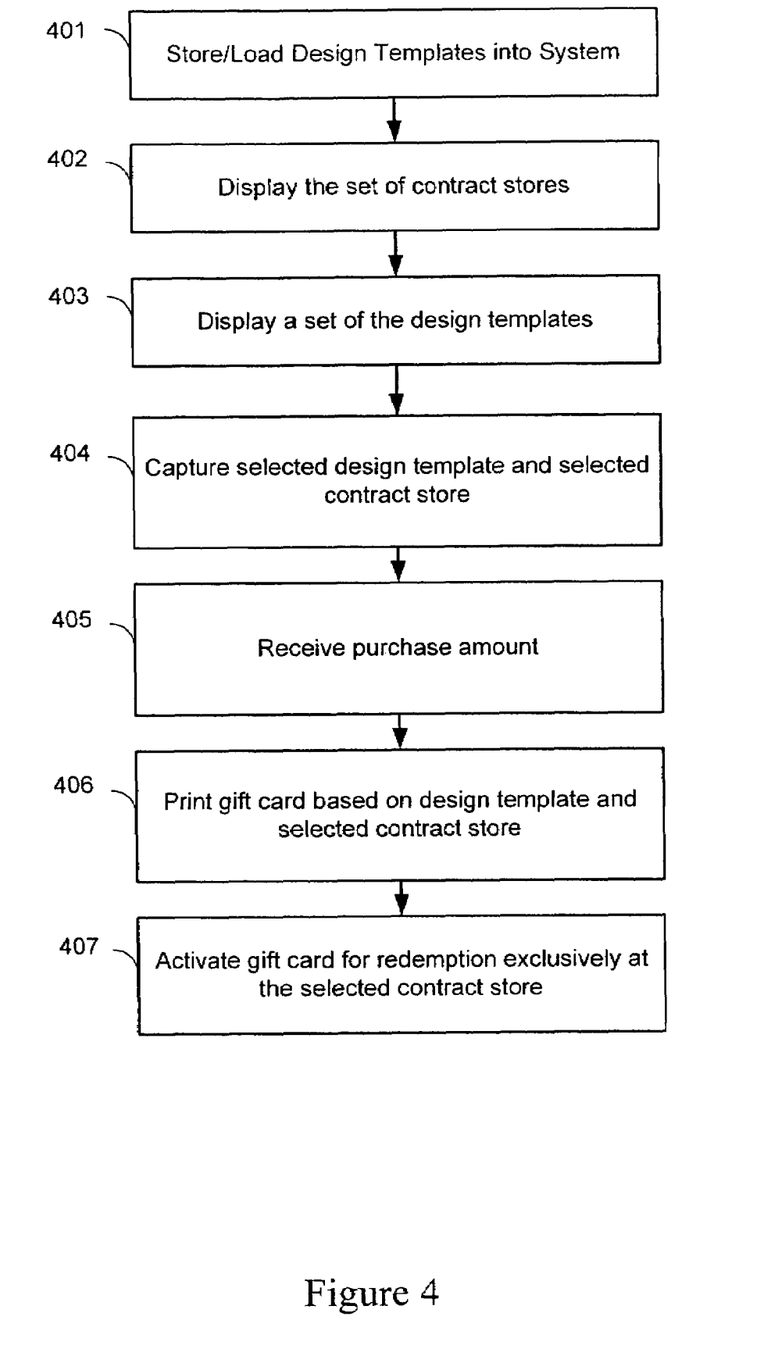
FIG. 4 illustrates an embodiment of a process for customizing a gift card.

FIG. 4 illustrates a process for customizing a gift card. This process may be implemented by any one of the computers illustrated in FIGS. 1-3B. The computers may execute program instructions that are adapted to perform the methods of FIG. 4. In one embodiment, a computer used to execute the program instructions may also be a standalone computer. The computer may be a kiosk, such as the one illustrated in FIG. 3B. Alternatively, the computer may be a personal computer at the home of a customer which may or may not be connected to the Internet.

FIG. 4 illustrates that a plurality of design templates may be provided to a computer system at block 401. For example the design templates may be loaded on a computer-readable medium that the computer system has access to, such as a central database 52. The design templates may be pre-designed and then placed in computer storage for access by various computing devices 96 such as gift card vending devices or kiosks 25. Alternatively, the design templates may be preloaded to each of a plurality of standalone computing devices.

A computer (e.g., computer 96) may display a set of contract stores for redeeming the gift card at block 402. In this case, a retail company vending the gift card may establish an agreement between itself and one or more contract stores, wherein each contract store agrees to honor a purchase at the contract store based on the amount on the gift card if the contract store is designated by the gift card. Thus, gift cards may be created for multiple contract stores in which they may be redeemed. It should be noted that the contract store may also include any store that is affiliated with a vending company, e.g., any retail store owned and/or operated by the vending company. Process block at block 402 allows a pharmacy retail store to create gift cards for redemption with the particular retail store (or affiliate stores of the vendor company) and/or for third party contract stores. As discussed above, this may be beneficial for a number of reasons. For example, a pharmacy retail store may find it beneficial to enter into an agreement with a second retail store to redeem each others cards because cross selling would be beneficial to both parties.

A set of the plurality of design templates may be displayed to a user at block 403. The customer may then select a design template to be printed. Depending on the user's desire to customize his gift card, at least one template field of each one of the plurality of design templates may be modifiable by a customer based on a rule set (to be discussed further below).

The customer may provide a set of inputs at block 404, including a contract store selection, a design template selection, and a gift card amount, where the gift card amount may correspond to a payment received from the customer by a vendor (e.g., at the kiosk or at a counter). When one or more fields of the gift card template are modifiable, the computing device may also accept a field modification as an input. The inputs may be received using a computer interface such as a keyboard 98 or mouse (not shown). The inputs may also be received at a kiosk 25, such as the one illustrated in FIG. 3B. Alternatively, the inputs may be received via any other computer connected to the Internet.

The customization process may then involve printing the gift card based on the selected design template and the contract store selection (and/or modifications, if any) 406, and activating the gift card for redemption exclusively at the selected contract store 407 in an amount corresponding to the gift card amount. The printing at block 406 and activation at block 407 may be done at the same point of sale, for example at a kiosk or other computer at a retail store. When a kiosk or computing device is not equipped with a printer, the gift card may be printed in a different location within a store and delivered to the customer at checkout. In the case of a pharmacy retail store vendor, the gift card may be picked up with a prescription fill. Alternatively, in one embodiment the printing may done at a store for pickup after the customer customizes his gift card online via, for example, the Internet. Alternatively, the gift card may be printed at an independent mail and packaging facility and subsequently mailed to a customer.

Activating the gift card at block 407 may involve coding an indication on a magnetic strip (e.g., 901 of FIG. 9) of the gift card that the gift card is active. Activating may also include providing an entry in an accounting system that the gift card is active. For example, each gift card may be uniquely identified with an identifier printed on the card or coded on the magnetic strip. An entry into the account system may associate the identifier with an indicator that the card is active. This entry may be, for example, in an account maintained by a contract store as well as the vending store. Activating may also include associating a value, such as a dollar amount, on the card. This may be done by coding the magnetic strip accordingly. In one embodiment, as purchases are made with the card at a vendor retail store or at a contract store, the amount of the purchases may be deducted from the amount remaining on the card. This deduction may be coded on the gift and/or in an account associated with the gift card identifier. Some gift cards may be reloadable (i.e., value may be added to the card multiple times) depending on third party and vendor rules.

Figure 5:
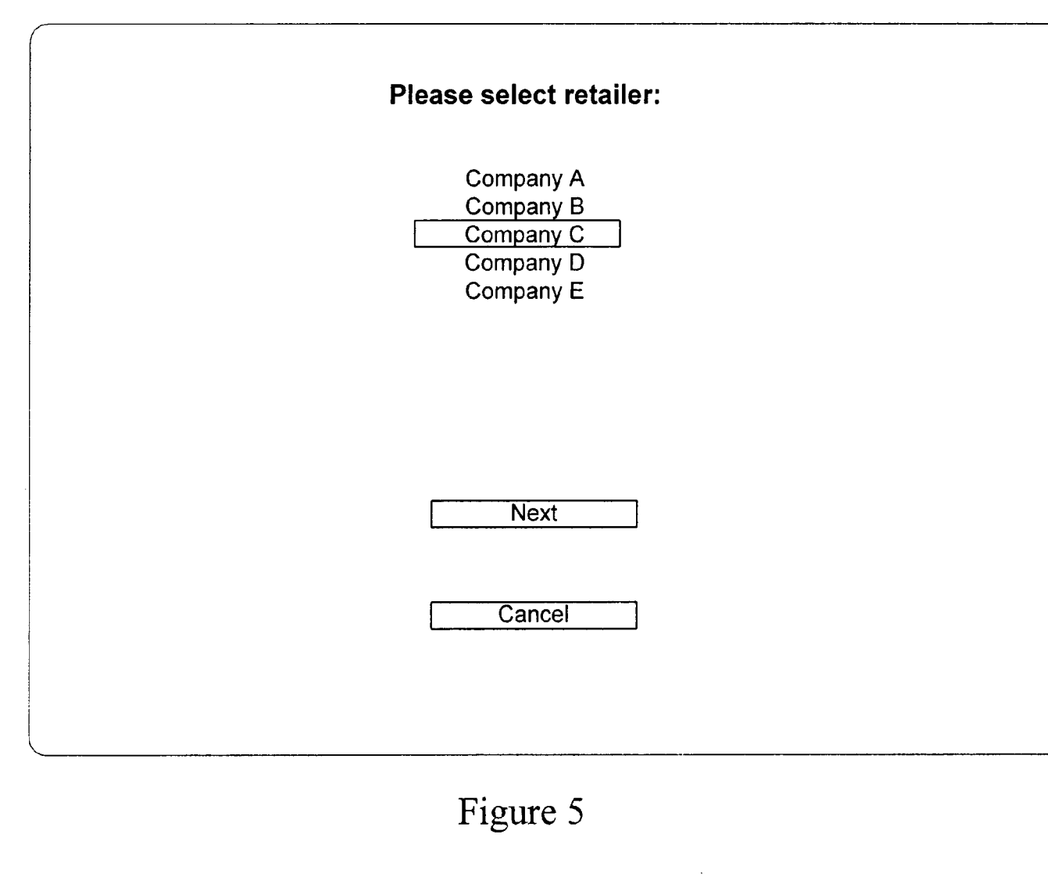
FIG. 5-7 illustrates a set of displays that may be used to direct a customization process in one embodiment at a gift card vending point of sale.

FIG. 5 illustrates an embodiment of a computer display that may be presented to a customer wishing to customize and purchase a gift card. In this embodiment, the customer may be provided a list of participating (or contracted) stores in which the gift card may be redeemed. The gift card may be redeemed at more than one store, including the store that vends the gift card, or may be limited to redemption at only one store. As discussed above, two or more companies that sell complimentary products may each experience increased sales by vending a gift card at one company's store that is redeemable at the other company's store or at both companies' stores. Thus, some retail companies, such as pharmacies, may desire to cross promote gift card sales with other companies.

However, in the case of multiple contract store selections, a customer may be restricted to only certain combinations of contract stores that may redeem the card. This may be the case where the vendor store would like to isolate the associations between two or more of its contract stores. For example, while some store arrangements may be complimentary, other combinations may be detrimental to one or more participants of a gift card program. For example, a retail company A may have a relationship or arrangement with a retail company B and a retail company C. This may be driven by the fact that gift cards may be freely redeemed between company A and company B or company A and company C. However, in the situation where company B and company C are competitors, having a gift card that is vended by company A that may be redeemed at both company B and company C may be detrimental to company B and C. Thus, some exclusivity may be desired in a gift card arrangement between A, B, and C.

Figure 6:
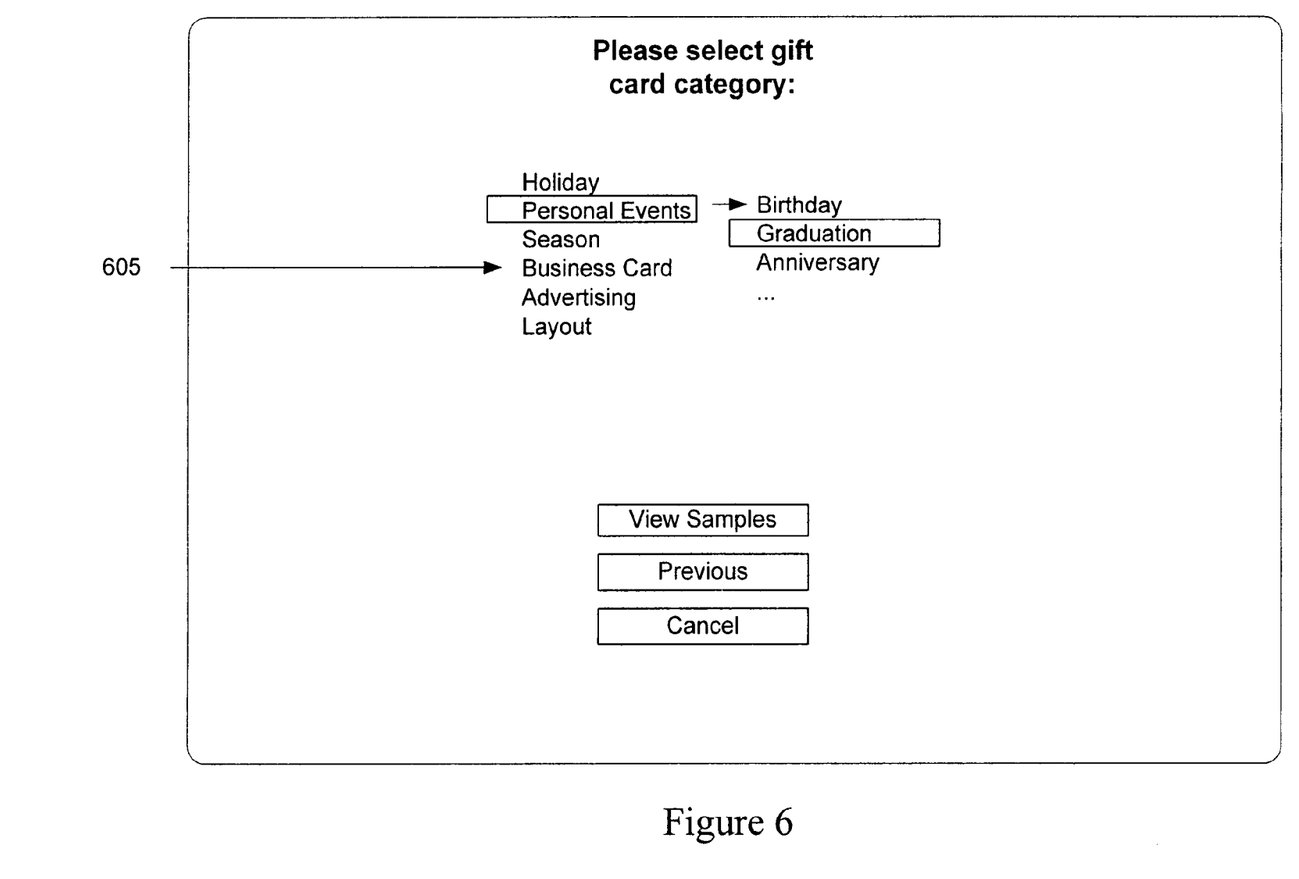
Figure 7:
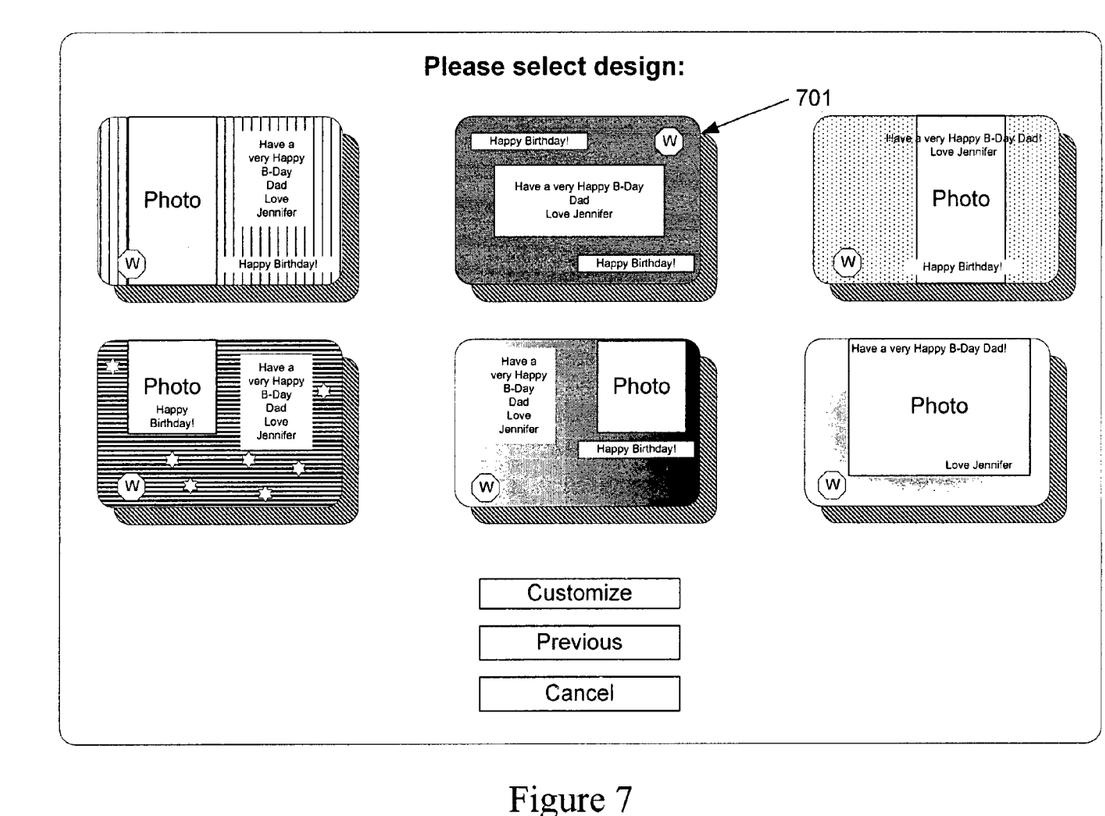

Because the number of design templates may be too numerous to display at one time, FIG. 6 illustrates a list of design template categories that may be presented to a user to during the customization process. Categories may be generally organized by event or recipient. These categories may be broken into subcategories. For example, a list of general categories may include holidays, personal events, seasonal greetings, general events, business card designs, layout, etc. Subcategories for the general category of personal events may include, for example, birthdays, graduations, anniversaries, etc. After the subcategory is selected, a user may be presented a number of design templates for the category or subcategory as illustrated in FIG. 7.

Figure 8:
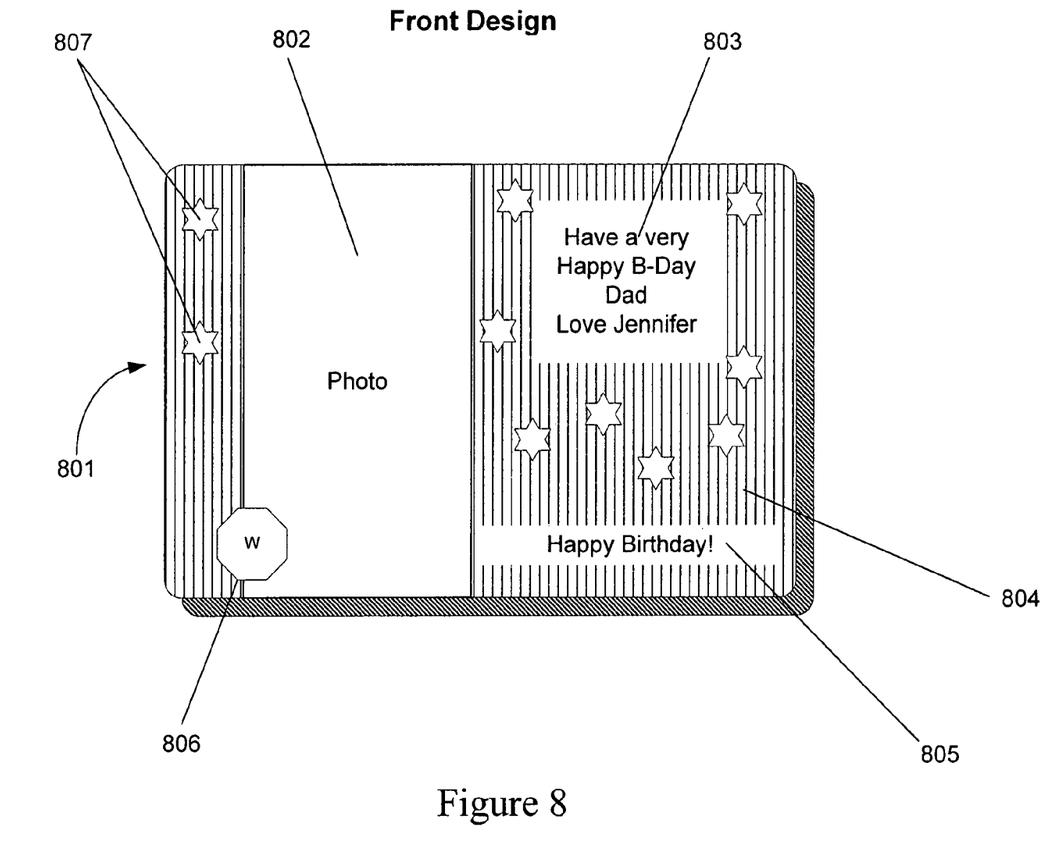
FIG. 8 illustrates an embodiment of a gift card template for a front face.
Figure 9:
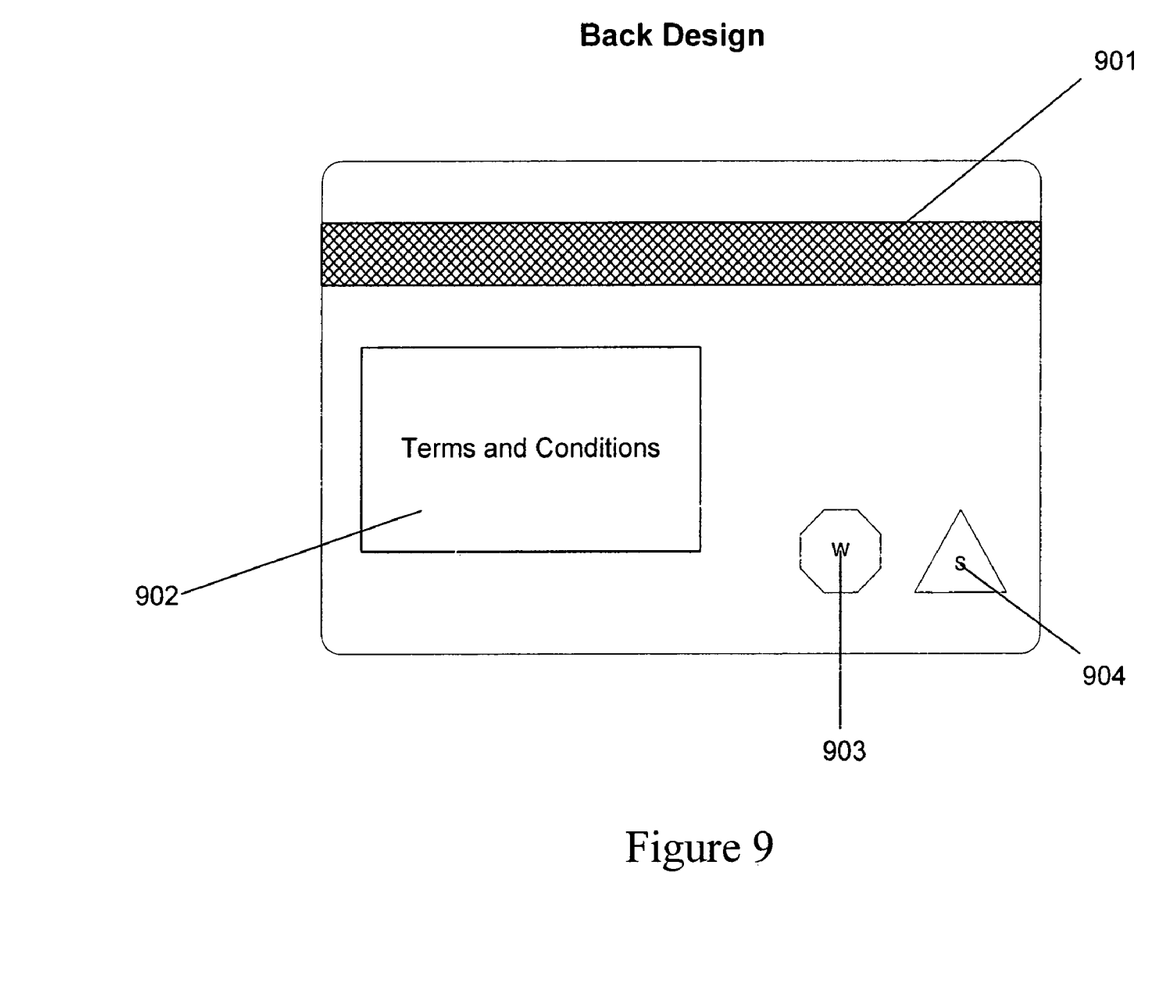
FIG. 9 illustrates an embodiment of a gift card back face.

Once a category or subcategory is chosen, a customization screen showing a selected design template may be used as illustrated in FIG. 8. The design template may include a front as illustrated in FIG. 8, and back as illustrated in FIG. 9. The customization system and method may start with a blank card stock having only an magnetic stripe imprinted one side for storing identification information. In some cases, where there is little customization to be done to one side of the card (e.g., the back), a terms and conditions section 902, and one or more company logos 903 and 904 may be part of the stock card. In other cases, to be discussed below, the terms and conditions and company logos may be customized or printed by the system as well.

As illustrated in FIG. 8, a template may include a plurality of fields 801-806 and a layout for the plurality of fields. A field may simply be a container or an area that provides a graphic or a text and is positioned on a card outline 801. The relative positions of the plurality of fields 801-806 on a template may constitute a template layout.

Customization of a gift card may involve allowing a customer to change or determine the parameters of a field, such as the content of a field or the position of the field, thereby manipulating the layout of the gift card. Customization of the gift card may include allowing a customer to provide a photo which may be incorporated into a field 802 of the gift card, as illustrated in FIG. 8. Options for providing a photo may include customer scan-in, customer provided storage media, Internet albums, existing photo store (stock photos), Internet, customer temporary photo store. Customer provided storage media may include flash drives from cameras, cell phones, personal scanners, etc. or other computer readable medium, such as floppy disks and compact disks. In one embodiment, a vendor, such as a pharmacy, may have an archive of photos for the customer in a database accessible by a point of service terminal, such as a kiosk. This may be the case, for example, where a customer enters a pharmacy store for developing prints from a digital camera. In this situation, the customer may be directed to a point of service terminal, such as a kiosk, to access the photo archive and insert photos into the gift card for customization.

Photos may also be provided via downloads. For example, the customer may be provided access to the Internet for downloading particular photographs for insertion into the gift card design. For example, a customer may have a photo album online that is associated with the vendor for downloading pictures. In one embodiment, a kiosk 25 may access a photo repository account of the customer (e.g., an account accessible on the Internet or within a store network) to display a set of photos for the customer to choose from and insert into a field of the selected template.

The customer may also be allowed to select a number of different patterns or graphics which may fill a template field. Aside from a photo, a customer may determine the fill pattern or graphic for a background 804, 807. A customer may also be able to customize or insert text in a text field 803, 805. For example, the customer may provide his or her own personal greeting 803, 805. Some gift cards may not have photos, such as 701 in FIG. 7. The pharmacy may have licenses to third party photographs, characters, or other graphics 807. This may include copyrighted clip art. These graphics 807 may also be inserted into select fields of the design template.

In one embodiment, the customer may be allowed to customize an accompanying envelope. The envelope may provide designated space for providing a "To,", "From," and "$ Amount" fields for fill in by customer via handwriting or printer. The envelope may be sized for the gift card.

The vendor may implement rules for how the templates may be modified. This may be useful, for example, to protect certain fields or layouts the vendor feels should not be tampered with to protect its contracted parties. For example, a contracted party may provide a notice specific to the contract party (e.g., a policy, a terms and conditions notice, a contract, etc.) that the vendor may be required to place on the card. Accordingly, this field may be made non-modifiable. In one embodiment (not shown), a denomination or amount on the gift card may be a field on the template that is non-modifiable and non-selectable.

Whether a field is modifiable or non-modifiable may be designated by a rule set. This rule set may be captured by a table or other indexing mechanism. In one embodiment, the rule set for each of the plurality of fields may have a number of parameters associated with it. This may include a position, a shape, a size, and a content of a field. Each of the parameters may include an associated parameter indicating whether the parameter is modifiable or non-modifiable. Thus, a subset of the set of parameters of a field may be designated modifiable while other parameters are non-modifiable. For example, while the content of a field may be made modifiable, the position or size of the field may be made non-modifiable.

Additionally, another field parameter may be used to determine what kind of content may be inserted into the field. For example, when a photo field is being modified, a filter may be implemented to recognize undesirable content that may be prevented from being inserted. A filter may also be applied to text content.

Another parameter may be used to set a relationship between two fields. For example, a contracted third party may provide rules for acceptable logo use to prevent dilution of a logo. These rules may include restrictions on the placement and positioning of the logo on the gift card, as well as how the logo may be used in combination with customizable fields. Thus, certain fields, such as a logo field, may only be adjusted (e.g., logo position) with other fields. For example, when fields overlap one another, the logo field may have a parameter on which field is shown on top, or is dominant over the other field. The logo field may be made to always be on top of another field. Alternatively, in situations where there are multiple contracted parties, the logos of each company may only be repositioned in unison with all other logos.

Figure 10:
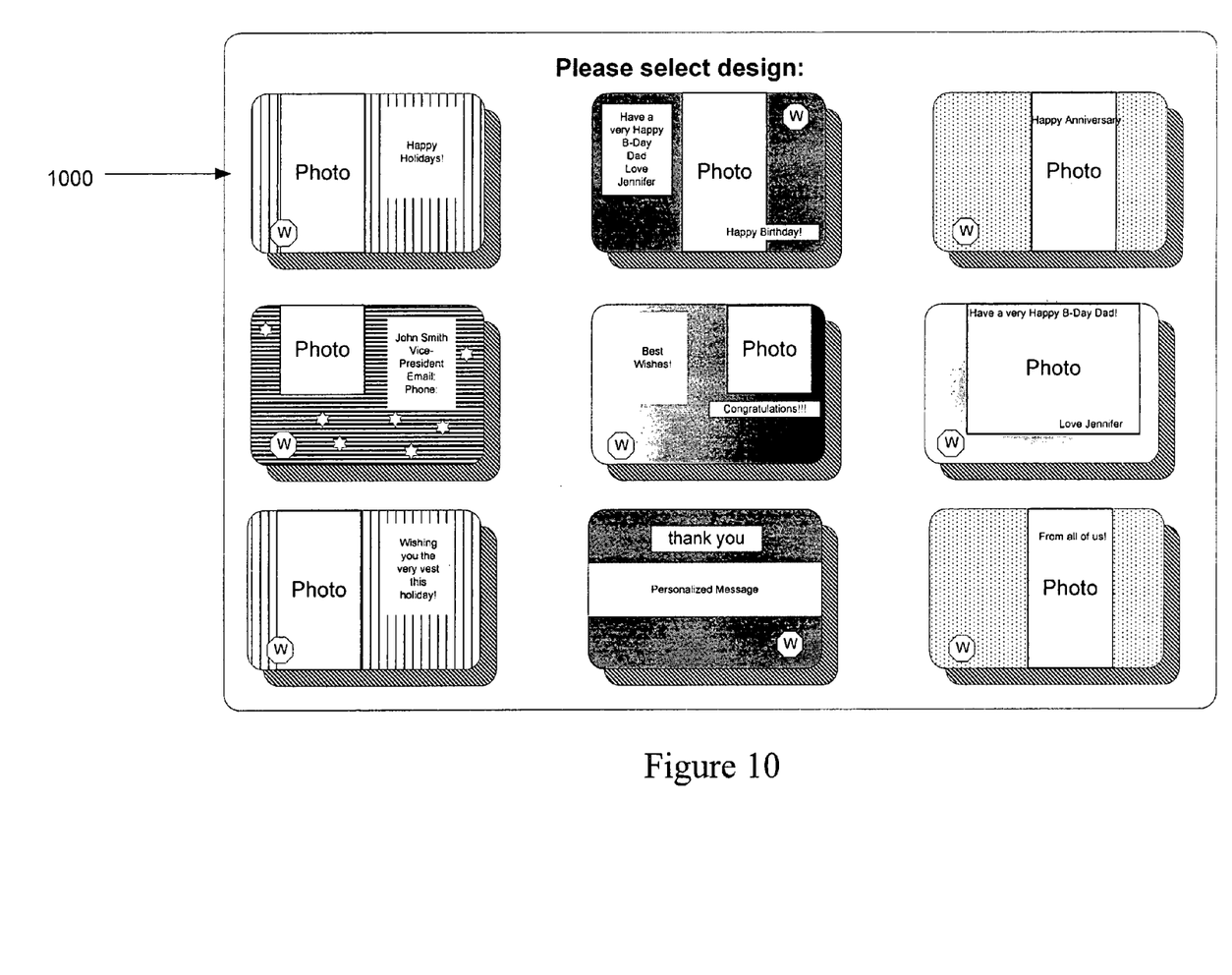
FIG. 10 illustrates a general design template selection display.

In one embodiment, instead of displaying a text listing of categories, the user may be presented with a visual picture of several gift card templates 1000 as illustrated in FIG. 10. In this situation, the text listing of categories illustrated in FIG. 6, may only be presented (e.g., as an option) after a graphical listing of the templates is displayed. The gift card templates may be a representation of a gift card template category. For example, one template of each gift card category may be displayed. The gift card templates 1000 may also be displayed by event type, a greeting type, or a layout (e.g., including a color scheme and texture, or field positions).

In one embodiment, the display of templates may be based on a user input or characteristic. For example, a set of templates may be presented to a user based on a history of previous use. For example, if a user previously customized a birthday gift card, then the system may present a default set of birthday templates under the personal events categories when the user attempts to create a new gift card. In this situation, the computing device may be programmed to keep a record of the user via an account. For example, the user may have the option of creating an account using a login and/or password. In this manner, the computer can track previous customization history.

In another embodiment, the listing of templates may be based on a promotion code. In one embodiment, a receipt from the vending store or a contract store may provide an invitation (perhaps including an incentive) for a user to purchase a gift card, based on a purchase. The templates may be related to an item of purchase. For example, if the user purchased a picture frame, templates for anniversary related events may be displayed first. Another source of a promotion code may be when a user in the store takes a coupon for purchasing a toy or product that includes a copyrighted character. The vending store may present templates containing the copyrighted characters based on the promotion code.

Figure 11:
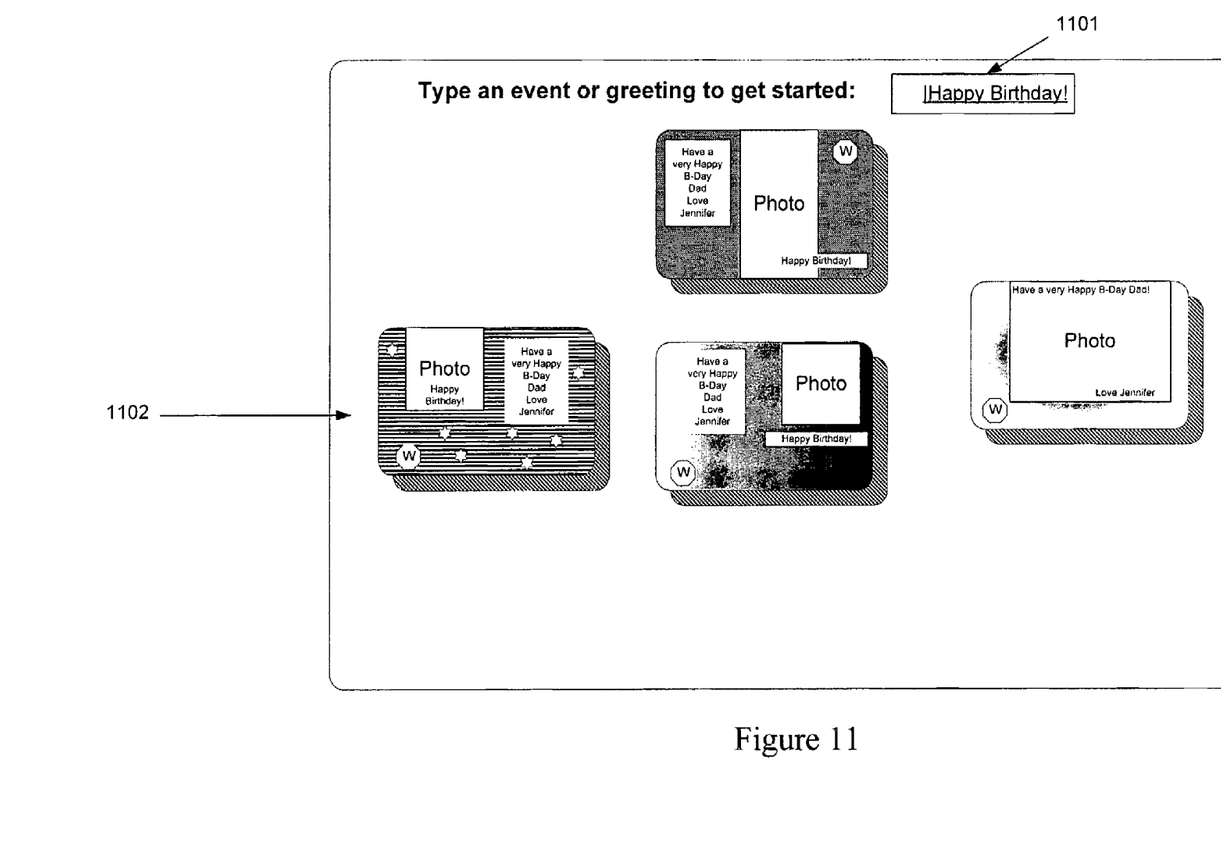
FIG. 11 illustrates a display for listing design templates based on a text input.

In another embodiment, the listing of templates may be based on an inputted text message. For example, in the display of FIG. 11, an additional input text box 1101 may be displayed to the user with a prompt to enter a gift card category. The user may type in a phrase that relates to a gift card category. For example, if the user types in the word "anniversary," then the anniversary gift card templates may be displayed. Alternatively, input box may be displayed with a prompt for a gift card message or greeting. If the inputted text is, for example, "happy birthday," (as illustrated by 1101) then templates associated with birthday themes 1102 may be displayed.

There may exist various related selling opportunities to gift cards purchases for some types of retail stores. Some pharmacies, for example, may have existing photo kiosks (which only vend physical prints of digital photos uploaded by a customer using portable storage devices) which may be linked to a gift card vending kiosk as describe above. In this situation, during the transaction with the customer at the photo kiosk, the photo kiosk may display, prompt, or otherwise advertise to the customer that the photos of the customer may be used in a customizable gift card. Thereafter, the customer may be directed to the gift card kiosk, to customize a gift card with the option of using photos from the collection of photos the customer uploaded at the photo kiosk. In this case, the gift card kiosk may access the customer photos at the photo kiosk in a number of ways. For example, the photo kiosk may be linked to the gift card kiosk and the gift card kiosk may be adapted to retrieve photos from the photo kiosk. Alternatively, the photo kiosk may simply upload its photos to a database archive that is accessible to the gift card kiosk. It should be noted that this arrangement between having a separate photo kiosk and gift card kiosk may be replaced or supplemented by a kiosk that provides both photo services (i.e., a kiosk that prints out photos from digital media) and gift card services.

In another embodiment, a vendor store may provide a postal stamp machine that vends stamps with the vendor's logo. In this situation, the postal stamp machine may display, prompt, or otherwise advertise to the customer that gift cards may be customized and purchased along with or in addition to the photo stamp purchase. Similar to the photo kiosk described above, the photo stamp kiosk may be combined with the gift card system or as a separate kiosk.

In another embodiment, the gift card may be advertised or marketed as a form of a business card. In this situation, a set of templates for business information, as illustrated by the business category 605 of FIG. 6, may be displayed as the user is proceeding through the customization process described above. The business templates may provide logo fields for both the user's business as well as the gift card vendor, or other contracted stores. The rule set for customization may be set by the vendor as appropriate to prevent any dilution of the vendor and/or contract store logos. For example, the vendor and/or contract store logos may be shown less prominently on the front or only on the back side of the card, with an appropriate disclaimer indicating a dissociation. One benefit of combining a gift card with business information is that because the business-gift card has a monetary value, their may be an increased chance that the recipient of such a card may retain the card and remember the card. It should be noted that other advertising may also be placed on the card.

What is claimed:

1. A method of customizing a gift card comprising:
    storing a plurality of design templates in a computer-readable medium, the templates including a plurality of fields and a layout for the plurality of fields;
    displaying a set of contract stores and a set of the plurality of design templates to a customer, wherein selection of a contract store also selects a rule set specific to the selected contract store, and wherein at least one template field of at least a portion of the plurality of design templates is modifiable by a customer based on the rule set;
    receiving a set of inputs from a customer including the contract store selection, a design template selection, and a gift card amount, wherein the gift card amount corresponds to a payment received from the customer by a vendor;
    printing the gift card based on the selected design template and the contract store selection; and
    activating the gift card for redemption exclusively at the selected contract store in an amount corresponding to the gift card amount.

2. The method of claim 1, wherein the plurality of fields contains at least one of a text message or a graphic.

3. The method of claim 1, further comprising receiving an input that includes a modification to the at least one modifiable field and printing the gift card with the received modification.

4. The method of claim 3, wherein the modification to the at least one modifiable field comprises inserting into the field at least one of an electronic image selected by the user from an electronic image from aii album account on the Internet, an image inputted by the user via a scanner at a point of service location, or an image retrieved from a computer-readable medium containing at least one image file.

5. The method of claim 1, further comprising establishing an agreement between the contract store and the vendor of the gift card, wherein the contract store agrees to honor a purchase at the contract store based on the amount on the gift card if the contract store is designated by the gift card.

6. The method of claim 1, a herein the set of contract stores includes the vendor of the gift card.

7. The method of claim 1, wherein activating comprises authorizing the gift card for use at the selected contract store and forwarding payment data pertaining to the activated gift card to a server computer associated with the selected contract store.

8. The method of claim 1, wherein at least one field of the selected template comprises a logo of the selected contract store or a logo of the vendor of the gift card, and wherein at least one field comprises at least one of a policy, a notice, or a contract associated with the contract store or the vendor.

9. The method of claim 1, wherein the rule set comprises rules designating a set of modifiable and non-modifiable field parameters.

10. The method of claim 9, wherein a field parameter includes at least one of a position, a shape, a size or a layout of a field.

11. The method of claim 1, wherein one of the plurality of fields comprises a company logo and wherein the rule set comprises a rule for a parameter of the logo field.

12. The method of claim 11, wherein the rule for the parameter of the logo field prevents overlapping a second field over the logo field.

13. The method of claim 1, wherein the set of templates is displayed based on at least one of a customized text message inputted by the user, a browsing pattern of a user for previously displayed templates, an existing history of purchased gift cards, a user identity, or a promotion code.

14. The method of claim 1, wherein the set of templates is indexed based on at least one of an event type, a greeting type, a color scheme, a texture, or a layout.

15. The method of claim 14, wherein the event type comprises at least one of a holiday, a personal event, a season, a business, or an advertising.

16. A kiosk for vending customized gift cards comprising:
a display unit that is capable of generating video images;
a first input device;
a processing apparatus operatively coupled to the display unit and the first input device, the processing apparatus comprising a processor and a memory operatively coupled to the processor;
a network interface connected to a network and to the processing apparatus;
the processing apparatus being programmed to:
display a set of stores under contract with a gift card vendor;
display a plurality of design templates, wherein the templates include a plurality of fields and a layout for the plurality of fields, and wherein at least one template field of at least a portion of the plurality of design templates is modifiable based on a vendor specific rule set;
receive a set of inputs from a customer including a design template selection, a contract store selection, and a payment value, wherein the payment value is based on a payment received;
print the gift card based on the selected design template and the contract store selection; and
activate the gift card for redemption exclusively at the selected contract store in an amount corresponding to the gift card amount.

17. The kiosk of claim 16, further comprising a second input device for inputting an image for insertion into the at least one modifiable template field.

18. The kiosk of claim 16, wherein the second input device is one of a scanner or an interlace for reading computer-readable medium containing at least one image.

19. The kiosk of claim 16, wherein the kiosk accesses a photo repository account of the customer to display a set of photos for the customer to choose from and insert into the at least one modifiable held of the selected template.

20. A system for selling customized gift cards comprising:
a plurality of retail stores under contract with a gift card vendor, the plurality of retail stores connected by a network computer system;
a database for storing a plurality of design templates, the templates including a plurality of fields and a layout for the plurality of fields;
a first computer of the network computer system for displaying a listing of the plurality of contract retail stores and a set of the plurality of design templates to a customer, wherein each contract retail store has a rule set associated with it, and wherein at least one design template field of at least a portion of the plurality of design templates is modifiable by a customer based on a rule set;
receiving a set of inputs from a customer including a design template selection, a contract store selection, and a purchase amount, wherein the purchase amount is based on a payment received;
a printing device for printing the gift card based on the selected design template, the contract store selection, and the purchase amount; and
activating the gift card for redemption exclusively at the selected contract store in an amount corresponding to the purchase amount.

21. The system of claim 20, further comprising a mail facility for mailing the printed gift cards to a customer.

* * * * *